US010482098B2

(12) United States Patent
Pizzo

(10) Patent No.: US 10,482,098 B2
(45) Date of Patent: Nov. 19, 2019

(54) CONSUMING STREAMED DATA RECORDS

(71) Applicant: Microsoft Technology Licensing, LLC, Redmond, WA (US)

(72) Inventor: Michael J. Pizzo, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 248 days.

(21) Appl. No.: 15/351,126

(22) Filed: Nov. 14, 2016

(65) Prior Publication Data
US 2018/0136876 A1    May 17, 2018

(51) Int. Cl.
*G06F 16/25*    (2019.01)

(52) U.S. Cl.
CPC .................... *G06F 16/25* (2019.01)

(58) Field of Classification Search
None
See application file for complete search history.

(56) References Cited

U.S. PATENT DOCUMENTS

| 7,814,047 | B2 | 10/2010 | Jain et al. | |
|---|---|---|---|---|
| 7,849,049 | B2 | 12/2010 | Langseth et al. | |
| 8,078,645 | B2 | 12/2011 | Singh | |
| 2004/0034830 | A1* | 2/2004 | Fuchs | G06F 17/2258 715/234 |
| 2005/0132282 | A1* | 6/2005 | Panditharadhya | G06F 17/2247 715/210 |
| 2005/0289450 | A1* | 12/2005 | Bent | G06F 17/2247 715/221 |
| 2007/0083526 | A1* | 4/2007 | Srivastava | G06F 16/25 |

(Continued)

FOREIGN PATENT DOCUMENTS

| WO | 2015126961 A1 | 8/2015 |
|---|---|---|
| WO | 2015165545 A1 | 11/2015 |

OTHER PUBLICATIONS

Peng, et al. "Using JSON for Data Exchanging in Web Service Applications", In Journal of Computational Information Systems, vol. 7, Issue 16, Dec. 2011, pp. 5883-5890.

(Continued)

*Primary Examiner* — Tuan C Dao
(74) *Attorney, Agent, or Firm* — Ray Quinney & Nebeker; Thomas M. Hardman; Timothy J. Churna

(57) ABSTRACT

Aspects extend to methods, systems, and computer program products for consuming streamed data records. An application binds members (e.g., columns) of a structure (e.g., record) from a data source to memory buffers, and may specify one or more members be retrieved individually or be ignored entirely. The application requests one or more records from the data source be fetched into the memory buffers until it comes across a member that doesn't match the binding. The data source notifies of the application of data that is ready to be read from the exception member. The application can create or update binding information for the member, read data from the member, or ignore the member. When finished, the application requests the data source continue processing record(s). Additional members are copied into the memory buffers until the last member is read for the (set of) record(s) or another exception member is discovered.

20 Claims, 4 Drawing Sheets

(56) References Cited

U.S. PATENT DOCUMENTS

| | | | |
|---|---|---|---|
| 2007/0156835 A1* | 7/2007 | Pulkowski | G06F 16/25 |
| | | | 709/207 |
| 2008/0120333 A1* | 5/2008 | Sethi | G06F 16/214 |
| 2008/0270428 A1* | 10/2008 | McNamara | G06F 17/30876 |
| 2012/0158772 A1 | 6/2012 | Shafran et al. | |
| 2013/0339399 A1 | 12/2013 | Dorris et al. | |
| 2014/0279834 A1 | 9/2014 | Tsirogiannis et al. | |
| 2015/0039587 A1 | 2/2015 | Liu et al. | |
| 2015/0066891 A1 | 3/2015 | Gruber | |
| 2015/0370917 A1 | 12/2015 | Vandiver et al. | |

OTHER PUBLICATIONS

Florescu, Daniela, "Managing Semi-Structured Data", In Magazine of Queue—Semi-structured Data, vol. 3, Issue 8, Oct. 2005, pp. 18-24.

Mansuri, et al., "Integrating Unstructured Data into Relational Databases", In Proceedings of 22nd International Conference on Data Engineering, Apr. 3, 2006, pp. 1-12.

\* cited by examiner

CONSUMING STREAMED DATA RECORDS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

In many database environments, applications use Application Program Interfaces (APIs), such as, for example, Open Database Connectivity (ODBC) to access data from databases. An application pre-defines data buffers and populates the buffers as data is read off the wire from a database. These types of APIs are efficient when shape, order, and depth of data is known a priori. However, using these types of APIs to access database data can be problematic when the data comes in arbitrary order, the data contains nested structure of arbitrary depth or size, or when metadata describing a full set of data values is not available to the application.

One approach to handle the problem is to define an API where API implementation (rather than the application) allocates the memory. The API can then allocate memory as needed as it reads data off the wire. The application can then free the memory when no longer needed. Another approach is to sample data in to infer a fixed schema. During sampling, nested structure can be flattened.

BRIEF SUMMARY

Examples extend to methods, systems, and computer program products for consuming streamed data records. An application binds members (e.g., columns) of a structure (e.g., record) from a data source to memory buffers. Alternately, an application may specify one or more members be retrieved individually or be ignored entirely. The application requests one or more records from the data source be fetched into the memory buffers (in any order) until it comes across a member that is an exception to the binding. The data source notifies of the application of data that is available to be read from the exception member. The application determines from the data source which member (and record) has data available.

The application can create or update binding information for the exception member, read data from the exception member as an individual value or stream, or ignore the exception member. When the application is finished processing the exception member, the application requests the data source continue processing the record(s). Additional members are copied into the memory buffers until either the last member is read for the record(s) or another exception member is discovered. The application can request the data source continue processing the record(s) until no further exception members are discovered. The application can then request data from a next (set of) record(s) if appropriate.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
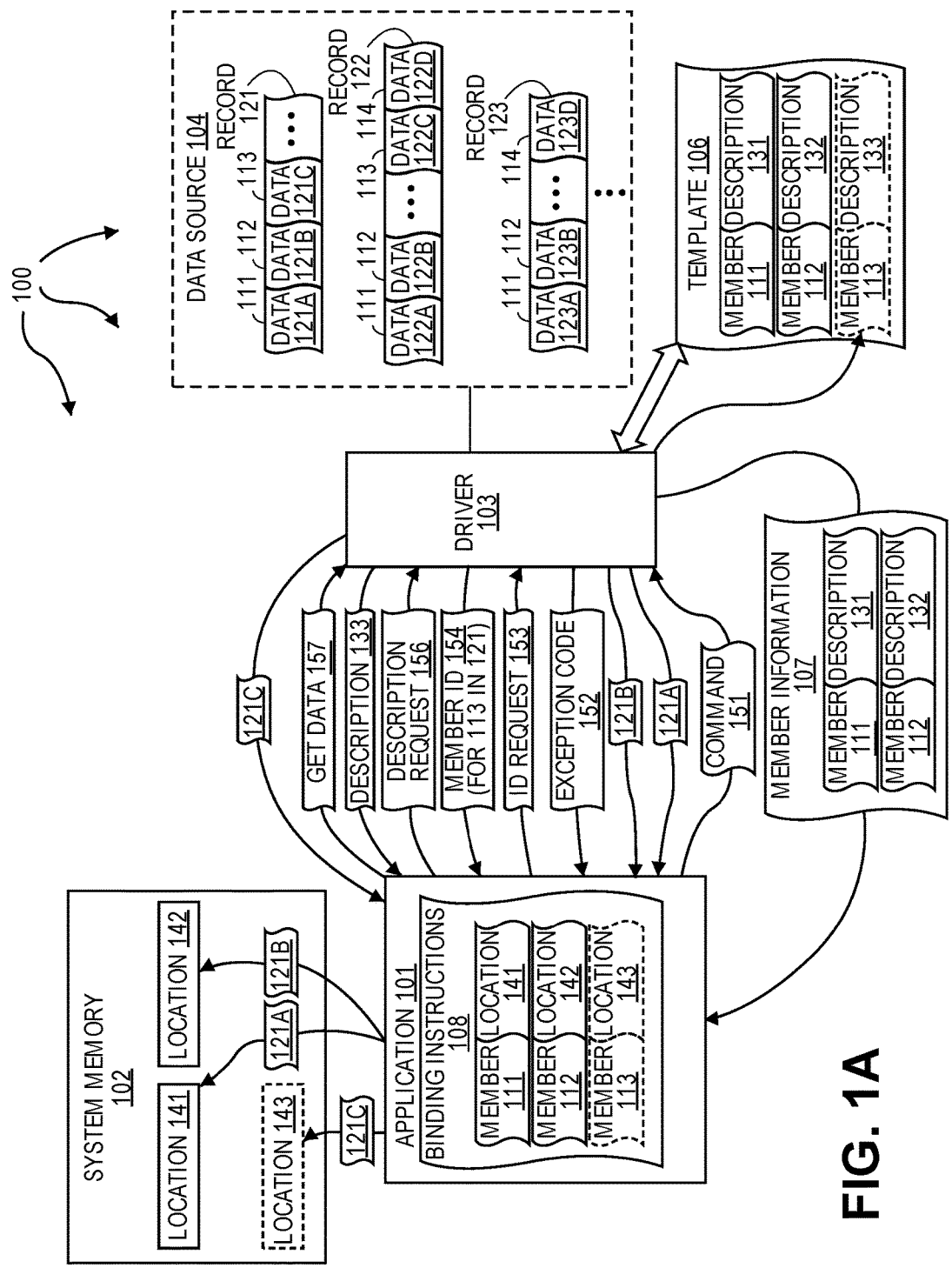
FIGS. 1A-1C illustrate an example computer architecture that facilitates consuming streamed data records.

Examples extend to methods, systems, and computer program products for consuming streamed data records. An application binds members (e.g., columns) of a structure (e.g., record) from a data source to memory buffers. Alternately, an application may specify one or more members be retrieved individually or be ignored entirely. The application requests one or more records from the data source be fetched into the memory buffers (in any order) until it comes across a member that is an exception to the binding. The data source notifies of the application of data that is available to be read from the exception member. The application determines from the data source which member (and record) has data available.

The application can create or update binding information for the exception member, read data from the exception member as an individual value or stream, or ignore the exception member. When the application is finished processing the exception member, the application requests the data source continue processing the record(s). Additional members are copied into the memory buffers until either the last member is read for the record(s) or another exception member is discovered. The application can request the data source continue processing the record(s) until no further exception members are discovered. The application can then request data from a next (set of) record(s) if appropriate.

A variety of exceptions to a binding are possible. An exception can be new data values (columns) that an application has not previously encountered. An exception can be data values that cannot be populated into bound buffers because the data values do not match one or more of expected type, length, precision, or scale. An exception can be one or more columns for which an application does not pre-allocate memory, such as, for example, columns containing nested structure of unknown size. Columns containing nested structure of unknown size include collections, records having unknown fields, etc. Exceptions can also include large or variable-length data for which an application does not pre-allocate memory.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: records, members, member descriptions, templates, member information, binding instructions, exception codes, streamed data, data commands, data requests, ID requests, member IDs, description requests, member descriptions, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, records, members, member descriptions, templates, member information, binding instructions, exception codes, streamed data, data commands, data requests, ID requests, member IDs, description requests, member descriptions, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Thus, aspects of the invention including services, modules, components, etc. can comprise computer hardware, software, firmware, or any combination thereof to perform at least a portion of their functions. For example, a service, module, component, etc. may include computer code configured to be executed in one or more processors and/or in hardware logic/electrical circuitry controlled by the computer code.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

An application binds members (e.g., columns) of a structure (e.g., record) from a data source to memory buffers and may specify one or more members be retrieved individually or be ignored entirely. The application requests one or more records from the data source be fetched into the memory buffers (in any order) until it comes across a member that is an exception to the binding. The data source notifies of the application of data that is available to be read from the exception member. The application determines from the data source which member (and record) has data available.

The application can create or update binding information for the exception member, read data from the exception member as an individual value or stream, or ignore the exception member. When the application is finished processing the exception member, the application requests the data source continue processing the record(s). Additional members are copied into the memory buffers until either the last member is read for the record(s) or another exception member is discovered. The application can request the data source continue processing the record(s) until no further exception members are discovered. The application can then request data from a next record if appropriate.

Memory for known, fixed size data can be allocated and bound ahead of time. Allocating and binding memory ahead of time optimizes an application to consume data this mostly structured. As additional fixed sized members (e.g., columns) are discovered the additional fixed size members can be added to the binding to optimize further retrieval.

Aspects provide a mechanism for handling data that does not match expected schema. A data source need not buffer data regardless of the ordering of record members in the result stream. The mechanism scales from the degenerative case (no known schema) to the optimal case (known, structured schema). Aspects also provide a mechanism for handling data of unknown length (i.e., nested streams or records of unknown size) as well as data that an application chooses not to bind because it is of a larger or variable length.

Figure 1B:
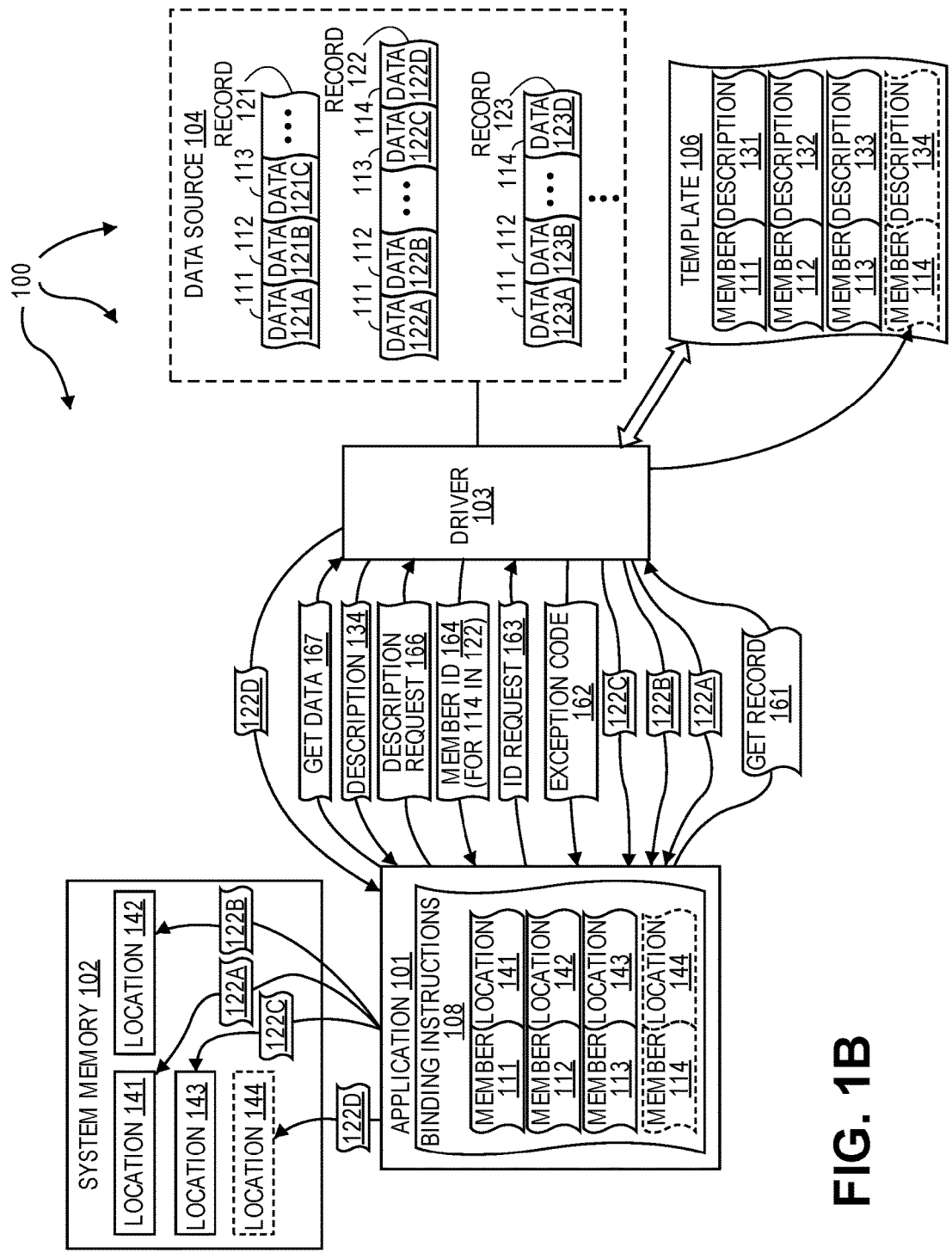
Figure 1C:
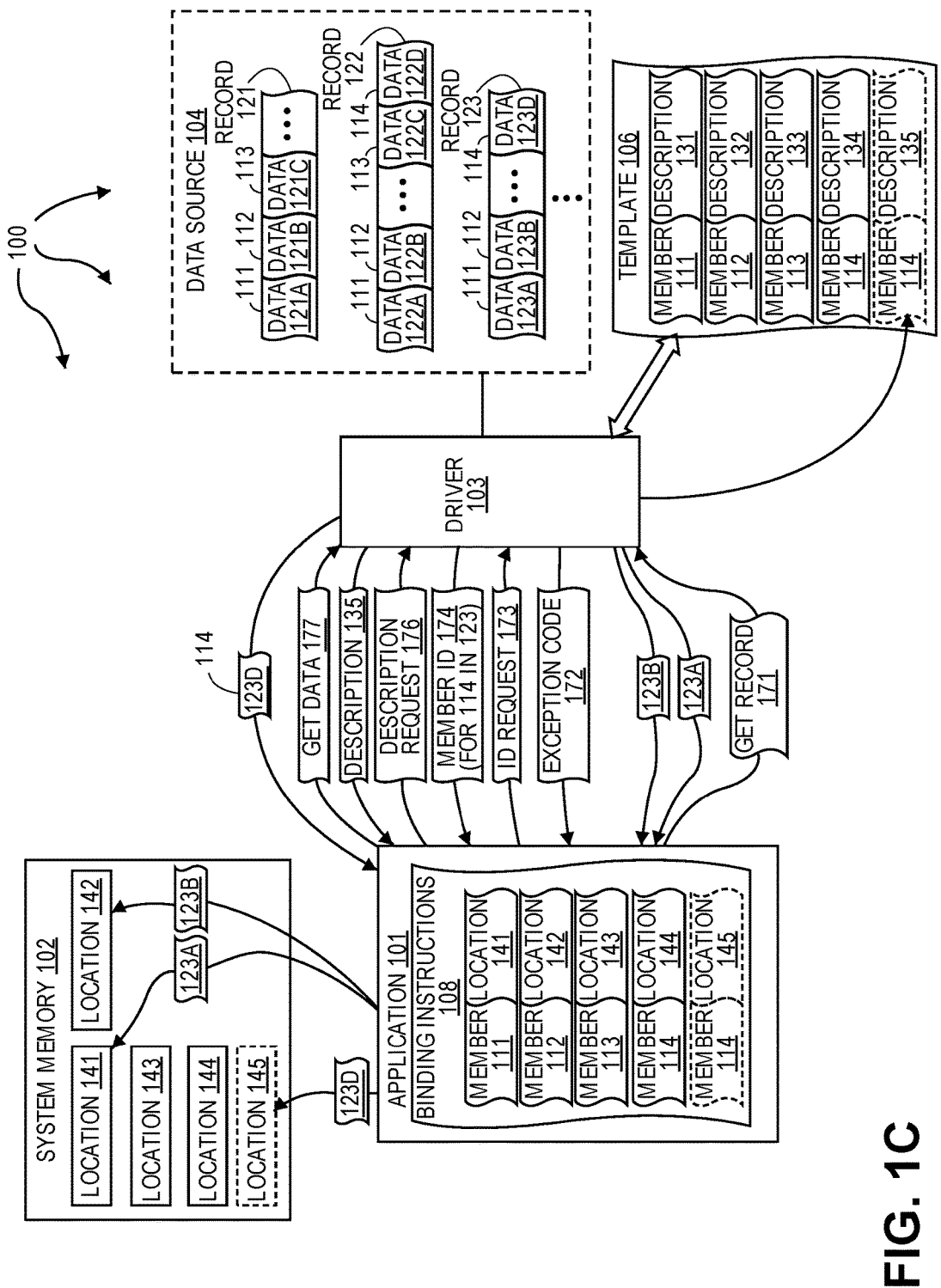

FIGS. 1A-1C illustrate an example computer architecture 100 that facilitates consuming streamed data records. Referring to FIG. 1A, computer architecture 100 includes application 101, system memory 102, driver 103, and data source 104. Application 101, system memory 102, driver 103, and data source 104 can be connected to (or be part of) a network, such as, for example, a Local Area Network ("LAN"), a Wide Area Network ("WAN"), and even the Internet. Accordingly, application 101, system memory 102, driver 103, and data source 104 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network. In one aspect, application 101 and system memory 102 are connected via a system bus at a computer system.

In general, application 101 can communicate with driver 103 to consume data streamed from data source 104. Application 101 can request data from driver 103 and driver 103 can stream the requested data to application 101. Driver 103 can maintain template 106. Template 106 contains members that driver 103 has previously encountered from data source 104 and their corresponding descriptions. A member description for a member can describe different aspects of the data contained in the member, such as, for example, data type (e.g., integer, string, floating point, complex, binary, character, image, Binary Large Object (BLOB), data structure, collection, stream, etc.), data length (e.g., string length), data precision (e.g., floating point precision), data scale, etc.

Prior to a request for data from application 101, driver 103 can provide member information for expected members to application 101. Application 101 can use the member information to form binding instructions 108 for binding data for the expected members to memory locations in system memory 102. Expected members (e.g., columns) can be a subset of members in a structure (e.g., a record). Expected members can be structured members of a semi-structured result, members specifically requested in a request that generates a stream, members encountered through inferences, etc.

As depicted, data source 104 includes a number of records including records 121, 122, 123, etc. Each of the records include a plurality of members. For example, record 121 includes member 111, member 112, member 113, and one or more other members (represented by the ellipsis). Record 122 includes member 111, member 112, one or more other members (represented by the ellipsis), member 113, and member 114. Record 123 includes member 111, member 112, one or more other members (represented by the ellipsis), and member 114.

In one aspect, each member is a column.

For each record, each member (e.g., column) in the record can contain data. The data can be a single value or a plurality of values (e.g., a data structure, list, collection, nested values, etc.). For record 121, member 111 contains data 121A, member 112 contains data 121B, and member 113 contains data 121C. Other members in record 121 can also contain data. For record 122, member 111 contains data 122A, member 112 contains data 122B, member 113 contains data 122C, and member 114 contains data 122D. Other members in record 122 can also contain data. For record 123, member 111 contains data 123A, member 112 contains data 123B, and member 114 contains data 123D. Other member in record 123 can also contain data. Other records of data source 104 can include one or more of the described members and/or other different members.

Data source 104 can be unstructured or semi-structured such that there is at least some member variability and/or data variability between the records contained in data source 104. Thus, as driver 103 encounters new records, additional and/or different members can be identified. Likewise, as driver 103 encounters new records, additional and/or different data can be identified. Driver 103 can update template 106 to document new member and/or variable data in known members.

In other aspects, data source 104 is structured such that there is minimal, if any, member variability. However, even when there is minimal variability, some members may not be suitable for pre-allocating memory because they are of a potentially large, unknown, or unbounded size.

Data source 104 can be part of a NoSQL database. The NoSQL database can use mechanisms for data storage and retrieval based on any of column, document, key-value, graph, or multi-model data models. In other aspects, data source 104 is a spread sheet, a Web page, a document, etc.

Figure 2:
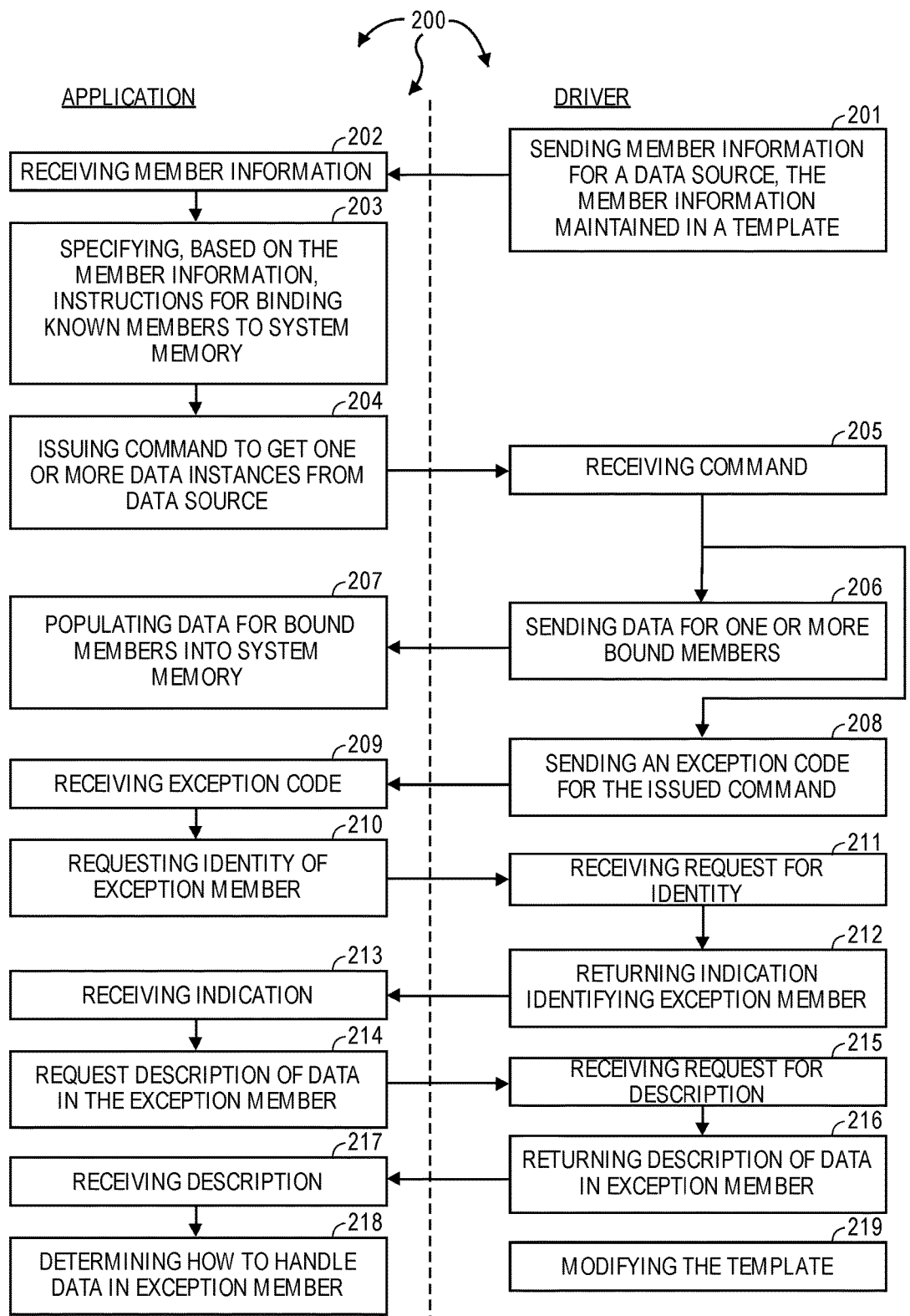
FIG. 2 illustrates a flow chart of an example method for consuming streamed data records.

FIG. 2 illustrates a flow chart of an example method 200 for consuming streamed data records. Method 200 will be described with respect to the components and data of computer architecture 100.

Application 101 can request member information from data source 104.

Method 200 includes sending member information for a data source to an application, the member information maintained in a template (201). Method 200 includes receiving the member information from the driver (202). For example, driver 103 can send member information 107 to application 101. Application 101 can receive member information 107 from driver 103. Member information 107 is maintained in template 106 and includes information for any known members of the records in data source 104. For example, member information 107 contains information for member 111 and corresponding description 131 and information for member 112 and corresponding description 132.

A corresponding description for a member can indicate one or more of: data type, data length, data precision, data scale, etc. for the member. For example, description 131 can indicate one or more of: a data type for member 111, a data length for member 111, a data precision for member 111, a data scale for member 111, etc. Likewise, description 132 can indicate one or more of: a data type for member 112, a data length for member 112, a data precision for member 112, a data scale for member 112, etc.

When a member contains data of a complex data type (e.g., data structure, list, collection, nested values, etc.), a corresponding description can describe data length, data precision, data scale, etc. for each portion of data contained in the complex data type. For data structures, members can be described through nested member information. For example, if member 112 were a data structure then description 132 might contain member information for one or more nested sub-members within description 132. Alternately, the individual members describing the members (columns) of the data structure may be part of member information 107.

For multi-valued members, the description may describe the members of the collection/list/stream (which may, in turn, be primitive, structured, or multi-valued). For multi-valued members, the number of elements in the collection/list/stream may be variable or unknown. As such, application may not pre-allocate memory for an entire multi-valued column.

Method 200 includes specifying, based on the member information, instructions for binding known members to system memory (203). For example, application 101 can specify binding instructions 108 based on member information 107. Binding instructions 108 indicate how to bind members 111 and 112 to corresponding locations 141 and 142 respectively in system memory 102. In one aspect, the first member is an exception.

In some aspects, instructions are specified for zero or more members. Certain types of members, such as members with long or varying lengths, structured members, or multi-valued members, may not suitable for binding to system memory 102. Instead, such values may need to be individually retrieved by application 101 as exception members as driver 103 reads data from data source 104.

Method 200 includes issuing a command to get one or more data instances from the data source (204). Method 200 includes receiving the command (205). For example, application 101 can issue command 151 to driver 103. Driver 103 can receive command 151 from application 101. Command 151 can request one or more records from data source 104.

Method 200 includes sending data for one or more bound members to the application (206). For example, driver 103 can stream data 121A for member 111 and data 121B for member 112 to application 101. Method 200 includes populating data for bound members into system memory (207). For example, driver 103 can refer to binding instructions 108 to store data 121A and 121B in memory locations 141 and 142 respectively.

In one aspect, method 200 can also include driver 103 detecting that data does not match template 106. For example, member 113 of record 121 may not be in template 106, or may not match description 133. A member may not match template 106 when the member has not previously been encountered by driver 103. In other aspects, a member in a record may not match template 106 when a data type, a data scale, a data (e.g., floating point) precision, etc. for the member differs from a data type, a data scale, a data precision, etc., encountered by driver 103 for the member in other records. For example, a member in one record may be an integer data type and the same member in another record may be a string data type. In another example, a member in one record is a string data type that fits within a given fixed length and the same member in another record is a string data type greater than the fixed length. In a further example, a maximum size is initially reported for a string but a larger string is subsequently encountered When data does not match template 106, driver 103 can modify template 106. Modifying template 106 can include adding member 113 and corresponding description 133 to template 106, or modifying description 133 to match member 113 of record 121. Adding member 113 and corresponding description 133 to template 106, or modifying description 133, permits driver 103 to include member 113 in member information sent to application 101 and/or other applications. Inclusion of member 113 and corresponding description 133 in member information, permits application 101 and/or other applications to bind member 113 to system memory when accessing data from subsequent records of data source 104 (e.g., from records 122, 123, etc.).

Method 200 includes sending an exception code for the issued command to the application (208). Method 200 includes receiving the exception code from the driver (209). For example, driver 103 can formulate exception code 152 upon encountering member 113. Exception code 152 indicates that driver 103 has detected an exception to template 106, or that member 113 is to be retrieved individually. Exception code 152 indicates that record 121 includes one or more exception members (e.g., member 113) that do not match information in template 106 or that are to be retrieved individually. Driver 103 can send exception code 152 to application 101. Application 101 can receive exception code 152 from driver 103.

Method 200 includes requesting the identity of the exception member from the driver (210). Method 200 includes receiving a request for the identity of the exception member from the application (211). For example, application 101 can send ID request 153 to driver 103. Driver 103 can receive ID request 153 from application 101.

Method 200 includes returning an indication identifying the exception member to the application (212). Method 200 includes receiving the indication identifying the exception member from the driver (213). For example, driver 103 can send member ID 154 (for member 113 in record 121) to application 101. Application 101 can receive member ID 154 from driver 103.

Method 200 includes requesting a description of the data in the exception member from the driver (214). Method 200 includes receiving the request for a description of the data in the exception member from the application (215). For example, application 101 can send description request 156 to driver 103. Driver 103 can receive description request 156 from application 101. Description request 156 can include member ID 154. Driver 103 can use member ID 154 to locate description 133 for member 113.

Method 200 includes returning the description of the data in the exception member to the application (216). Method 200 includes receiving the description of the data in the exception member from the driver (217). For example, driver 103 can send description 133 (of member 113 in record 121) to application 101. Application 101 can receive description 133 from driver 103.

Method 200 includes determining how to handle data in the exception member (218). For example, application 101 can determine how to handle data in member 113 of record 121. Application 101 can handle data in member 113 of record 121 by sending get data 157 to driver 103. Get data 157 requests data contained in member 113 of record 121. Driver 103 can receive get data 157 from application 101. In response, driver 103 streams data 121C to application 101. Application 101 receives data 121C from driver 103. For structured or multi-valued members, recursion can be used. For example, application 101 requests member information for nested structure or multi-valued member, optionally binds, requests data, may get an exception, etc.

Upon receiving data 121C, application 101 can store data 121C or ignore data 121C. In one aspect, application 101 updates binding instructions 108 to bind member 113 to location 143 in system memory 102. Driver 103 then writes data 121C in memory location 143. In another aspect, application 101 sends get data 157. In a further aspect, application 101 ignores data 121C after data 121C is received.

In one aspect, application 101 binds member 113 to location 143 prior to and instead of sending get data 157. Binding member 113 to location 143 prior to and instead of sending get data 157, more efficient streaming and reduces (and possibly eliminates) buffering by driver 103.

Alternately, application 101 can handle data in member 113 of record 121 by not even requesting the data contained in member 113 of record 121. In one aspect, application 101 calls a GetData function with a buffer length of zero to indicate it is not interested in data 121C. Other mechanisms for indicated data is to be ignored are also possible.

Method 200 includes modifying the template (219). For example, driver 103 can modify template 106. Modification of template 106 can include adding member 113 and corresponding description 133 to template 106 or modifying description 133 to match member 113 of record 121. Adding member 113 and corresponding description 133 to template 106 or modifying description 133, permits driver 103 to include member 113 in member information sent to application 101 and/or other applications. Inclusion of member 113 and corresponding description 133 in member information, permits application 101 and/or other applications to bind member 113 to system memory when accessing data from subsequent records of data source 104 (e.g., from records 122, 123, etc.).

After and/or in combination with handling data 121C, application 101 can request a next member from driver 103. Driver 103 can return data for a next member of record 121 to application 101. If the next member is also an exception member, acts 208-219 of method 200 may be repeated. Application 101 can request members of record 121 until members of record 121 are exhausted.

Turing to FIG. 1B, application 101 can send get record 161 to driver 103 to get a next record from data source 104. In response, driver 103 can stream data 122A, 122B, and 122C. Data 122C can be streamed even though there may be one or more other members between member 112 and member 113 in record 122. The one or more members between member 112 and 113 can be processed in order. The one or more members can be stored in appropriately bound buffers, ignored, or handled as exceptions as they are encountered. Driver 103 can refer to binding instructions 108 to bind data 122A, 122B, and 122C to locations 141, 142, and 143 respectively in system memory 102. Driver 103 can determine that member 114 has not previously been encountered. As such, driver 103 can send exception code 162 to application 101. Application 101 can receive exception code 162 from driver 103.

Prior to returning exception code 162 to application 101, driver 103 can modify template 106 based on description 134. Modification of template 106 can include adding member 114 and corresponding description 134 to template 106. Adding member 114 and corresponding description 134 to template 106, permits driver 103 to include member 114 in member information sent to application 101 and/or other applications. Inclusion of member 114 and corresponding description 134 in member information, permits application 101 and/or other applications to bind member 114 to system memory when accessing data from subsequent records of data source 104 (e.g., from records 123, etc.).

Application 101 can send ID request 163 to driver 103. Driver 103 can receive ID request 163 from application 101. In response, driver 103 can send member ID 164 (for member 114 in record 122) to application 101. Application 101 can receive member ID 164 from driver 103. Application 101 can send description request 166 to driver 103. Driver 103 can receive description request 166 from application 101. Description request 156 can include member ID 164. In response, driver 103 can send description 134 (of member 114 in record 122) to application 101. Application 101 can receive description 134 from driver 103.

Application 101 can determine how to handle data in member 114 of record 122. Application 101 can handle data in member 114 of record 122 by sending get data 167 to driver 103. Get data 167 requests data contained in member 114 of record 122. Driver 103 can receive get data 167 from application 101. In response, driver 103 streams data 122D to application 101. Application 101 receives data 122D from driver 103.

Upon receiving data 122D, application 101 can store data 122D or ignore data 122D. In one aspect, application 101 updates binding instructions 101 to bind member 114 to location 144 in system member 102. Driver 103 then writes data 122D in memory location 144. In another aspect, driver 103 writes data 122D in system memory but member 114 is not bound to location 144. In a further aspect, application 101 stores data 122D in some other location (e.g., durable storage). In an additional aspect, application 101 ignores data 122D after data 122D is received.

Alternately, application 101 can handle data in member 114 of record 122 by not even requesting the data contained in member 114 of record 122. For example, application 101 can used a GetData call with a zero buffer length or some other mechanism.

After and/or in combination with handling data 122D, application 101 can request a next member of record 122 from driver 103. Driver 103 can return data for a next member of record 122 to application 101. If the next member is also an exception member, acts 208-219 of method 200 can be repeated. Application 101 can request members of record 122 until members of record 122 are exhausted.

Turing to FIG. 1C, application 101 can send get record 171 to driver 103 to get a next record. In response, driver 103 can stream data 123A and 123B. Driver 103 can refer to binding instructions 108 to bind data 123A and 123B to locations 141 and 142 respectively in system memory 102. Driver 103 can determine that member 114 in record 123 differs from member 114 in record 122 in one or more of data type, data length, data precision, data scale, etc. As such, driver 103 can send exception code 172 to application 101. Application 101 can receive exception code 172 from driver 103.

Prior to returning exception code 162 to application 101, driver 103 can modify template 106 based on description 135. Modification of template 106 can include adding member 114 and (another) corresponding description 135 (i.e., an additional entry for member 114) to template 106. Adding member 114 and corresponding description 135 to template 106, permits driver 103 to include another description for member 114 in member information sent to application 101 and/or other applications. Inclusion of member 114 and corresponding description 135 in member information, permits application 101 and/or other applications to bind member 114 to system memory when accessing data from subsequent records of data source 104.

When a member appears multiple times in a template and/or binding instructions, each instance of the member can be referenced independently. For example, member ID 172 can be used to reference member 114 from record 122 and member ID 174 can be used to reference member 114 from record 123.

Application 101 can send ID request 173 to driver 103. Driver 103 can receive ID request 173 from application 101. In response, driver 103 can send member ID 174 (for member 114 in record 123) to application 101. Application 101 can receive member ID 174 from driver 103. Application 101 can send description request 176 to driver 103. Driver 103 can receive description request 176 from application 101. Description request 176 can include member ID 174. In response, driver 103 can send description 135 (of member 114 in record 123) to application 101. Application 101 can receive description 135 from driver 103.

Application 101 can determine how to handle data in member 114 of record 123. Application 101 can handle data in member 114 of record 123 by sending get data 177 to driver 103. Get data 177 requests data contained in member 114 of record 123. Driver 103 can receive get data 177 from application 101. In response, driver 103 streams data 123D to application 101. Application 101 receives data 123D from driver 103.

Upon receiving data 123D, application 101 can store data 123D or ignore data 123D. In one aspect, application 101 updates binding instructions 108 to bind member 114 to location 145 in system member 145. Driver 103 then writes data 123D in memory location 145. In another aspect, driver 103 writes data 123D in system memory but member 114 is not bound to location 145. In a further aspect, application 101 stores data 123D in some other location (e.g., durable storage). In an additional aspect, application 101 ignores data 123D after data 123D is received.

Alternately, application 101 can handle data in member 114 of record 123 by not even requesting the data contained in member 114 of record 123. For example, application 101 can used a GetData call with a zero buffer length or some other mechanism.

After and/or in combination with handling data 123D, application 101 can request a next member of record 123 from driver 103. Driver 103 can return data for a next member of record 123 to application 101. If the next member is also an exception member, acts 208-219 of method 200 can be repeated. Application 101 can request members of record 123 until members of record 123 are exhausted.

Application 101 can request additional records from driver 103 as appropriate until all records of data source 104 are exhausted or no further data is needed.

Accordingly, a driver can build up a template over time as exception members of a data source are encountered. In one aspect, a driver begins with a blank template and builds up the template as each exception (i.e., new or variant) member is encountered.

Data streaming and template updates can operate independent of one another. For example, a driver can begin streaming data from a next record prior to updating a template based on exceptions for encountered members in a prior record. If the same exception is redundantly identified in multiple records prior to a template update, an application can compensate for the redundancy through reference to binding instructions. Alternately, the application may just process a redundant exception as a separate different exception.

Aspects of the invention provide a hybrid approach for efficiently binding data. An application binds known/fixed sized members (columns) to memory buffers and then requests a record be fetched into those buffers. A driver is able to start reading data into those buffers, in any order, until it comes across a member that doesn't match the binding or was not bound, either because it was unknown or because it was not a fixed size.

The driver makes known to the application that additional data is ready to be read, either through a callback mechanism or simply returning a code from the request to fetch the data. The application determines, from the data source, which member is available and either creates a binding for it (if it is a fixed size, in which case it is added to the binding for fetching subsequent records), reads it as an individual value or stream, or decides to ignore the member. Once it has finished processing the new member, the application can request that the data source continue processing the record, copying additional members into the application buffers until either the last member is read for the current record or another unbound member is discovered. Accordingly, buffered data can be read form the wire without knowing the shape, order, and depth of the data a priori.

Aspects of the invention can also be extended to retrieve multiple records at a time. For example, an "array binding" can be used to bind a column to a buffer capable of holding multiple rows. As such, a command (e.g., command 151) can be used to populate one or more array-buffers with values from multiple rows.

Aspects of the invention can be applied to specific technologies, such as, for example, Open Database Connectivity ("ODBC"). A data source describes "known" columns in an "Implementation Row Descriptor" (IRD). An application is able to bind known columns to memory locations by specify binding information in an "Application Row Descriptor" (ARD). The application specifies a special indicator value (SQL_DATA_AT_FETCH) in the ARD for unbound data to be retrieved while populating buffers (i.e., structured columns, collections, or large values to be streamed).

The application calls SQLFetch or SQLFetchScroll in order to tell the driver to start reading data into the application buffers. The driver returns a special return code, SQL_DATA_AVAILABLE, in order to tell the application that there is an unbound or data-at-fetch value available to be retrieved. If this is a new column it is first added to the IRD, and the corresponding record in the ARD is defaulted to SQL_DATA_AT_FETCH. The application calls a function (SQLNextColumn) to find out from the driver what column is available. The driver returns the ordinal of the record in the IRD describing the column. The application can read the description of the column from the IRD.

If the column is a fixed length column, the application can specify a binding for it in the corresponding ARD record. The application can call SQLNextColumn to have the driver write the value to the corresponding memory buffer and continue processing. If the column is a large value to be read as a stream, a structured value, a collection, or fixed-size value that the user chooses to retrieve without binding, the application can call the appropriate method to retrieve the value (SQLGetData for streams or fixed sized columns, SQLGetNestedHandle for structured values or collections). To continue processing, the application calls SQLNextColumn, which returns SQL_DATA_AVAILABLE if additional unbound or data-at-fetch columns are discovered, otherwise returns success, success with info, or an error value if problems were encountered while reading the results.

The same mechanism can be used if a type does not match the expected/bound type. The driver can return SQL_DATA_EXCEPTION and the application can discover the actual type and retrieve it out of band or fix the binding and continue.

Aspects of the invention provide a number of advantages over other alternatives. Memory for known, fixed sized data can be allocated and bound ahead of time for optimal performance. This optimizes for the common case of data being mostly structured. As additional fixed sized members are discovered they can be added to the binding to optimize future retrieval. Data that does not match expected schema can still be handled. A data source (e.g., a driver) does not need to buffer data, regardless of the ordering of the record members in the result stream. The mechanism scales from the degenerative case (no known schema) to the optimal case (known, structured schema).

In some aspects, a computer system comprises one or more hardware processors and system memory. The one or more hardware processors are configured to execute the instructions stored in the system for an application to access a data instance from a data source.

The one or more hardware processors execute instructions stored in the system memory to receive member information for any known members of the data instance to be returned by a driver. The driver maintains a template of member information for known members. The one or more hardware processors execute instructions stored in the system memory to specify, based on the member information, instructions for binding known members to corresponding locations in the system memory.

The one or more hardware processors execute instructions stored in the system memory to issue a command to the driver to get the data instance from the data source. The driver populates the data for the bound members into the corresponding locations in the system memory. The one or more hardware processors execute instructions stored in the system memory to receive an exception code for the issued command from the driver. The exception code indicates that the driver has detected an exception to the template. The exception is indicative of the data instance including one or more exception members. The one or more exception members represents members of the data instance do not match the template.

The one or more hardware processors execute instructions stored in the system memory to, for at least one of the one or more exception members, request the identity of the exception member from the driver, receive an indication identifying the exception member, request a description of the data in the exception member from the driver, receive a description of the data in the exception member; and determine how to handle the data in the exception member.

In other aspects, a computer system comprises one or more hardware processors and system memory. The one or more hardware processors are configured to execute the instructions stored in the system to update a template for a data source.

The one or more hardware processors execute instructions stored in the system memory to receive a command from an application to get data from a data instance of a data source in accordance with a template. The template indicates members of the data source known to a driver. The one or more hardware processors execute instructions stored in the system memory to formulate an exception code at the driver. The exception code indicates that the driver has detected an exception to the template. The exception code is indicative of the data instance including one or more exception members that do not match the member information previously known to the driver.

The one or more hardware processors execute instructions stored in the system memory to, for at least one of the one or more exception members, receive a request for the identity of the exception member from the application, send an indication identifying the exception member to the application, receive a request for a description of the data in the exception member from the application, and send a description of the data in the exception member. The one or more hardware processors execute instructions stored in the system memory to, for the at least one of the one or more exception members, modify the template based on the description of the data in the exception member. Modifying the template permitting the application to bind the exception member to system memory when accessing data from subsequent data instances of the data source.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer system, the computer system comprising:
one or more hardware processors;
system memory coupled to the one or more hardware processors, the system memory storing instructions that are executable by the one or more hardware processors;
the one or more hardware processors configured to execute the instructions stored in the system memory for an application to access a data instance from a data source, including the following:
receive member information for any known members of the data instance to be returned by a driver, the driver maintaining a template of member information for known members;
specify, based on the member information, instructions for binding known members to corresponding locations in the system memory;
issue a command to the driver to get the data instance from the data source, the driver populating the data instance for the known members into the corresponding locations in the system memory;
receive an exception code for the issued command from the driver, the exception code indicating that the driver has detected an exception to the template, the exception indicative of the data instance including one or more exception members, the one or more exception members representing members of the data instance do not match the template;
for at least one of the one or more exception members:
request the identity of the exception member from the driver;
receive an indication identifying the exception member;
request a description of the data in the exception member from the driver;
receive a description of the data in the exception member; and
determine how to handle the data in the exception member.

2. The computer system of claim 1, further comprising the one or more hardware processors configured to execute the instructions to:
request an indication of a next member exception from the driver, resulting in the driver continuing to process the data instance according to the template; and
receive an indication from the driver that no further member exceptions are available for the data instance.

3. The computer system of claim 2, further comprising the one or more hardware processors configured to execute the instructions to return data for a next data instance prior to completing a template update based on the data instance by identifying the next data instance and a member with available data in the next data instance.

4. The computer system of claim 1, further comprising the one or more hardware processors configured to execute the instructions to modify the template to match the member information of the one or more exception members, the one or more exception members becoming known members in the template, the known members in the template permitting the application to bind the known members to system memory for use when accessing data from subsequent data instances of the data source.

5. The computer system of claim 1, wherein the exception code is indicative of the data instance including one or more new members, the one or more new members not previously included in the template.

6. The computer system of claim 1, wherein the one or more hardware processors configured to execute the instructions to receive an exception code for the issued command from the driver comprise the one or more hardware processors configured to receive an exception code indicative of the data instance including one or more members that contain a different data type, the different data type not previously indicated in the template for the one or more members.

7. The computer system of claim 1, wherein the one or more hardware processors configured to execute the instructions to receive an exception code for the issued command from the driver comprise the one or more hardware processors configured to receive an exception code indicative of a known member having one of: a different data length, a different precision, or a different scale, the different data length, precision, or scale not previously indicated in the template for the known member.

8. The computer system of claim 1, further comprising the one or more hardware processors configured to execute the instructions to receive data for any known members of the data instance previously bound to a corresponding location in the system memory.

9. The computer system of claim 1, wherein the one or more hardware processors configured to execute the instructions to determine how to handle the data in the exception member comprises the one or more hardware processors configured to execute the instructions to ignore the data in the exception member.

10. The computer system of claim 1, wherein the one or more hardware processors configured to execute the instructions to determine how to handle the data in the exception member comprises the one or more hardware processors configured to execute the instructions to:
bind the exception member to the application; and
populate the data in the exception member into a corresponding location in the system memory.

11. The computer system of claim 10, wherein the one or more hardware processors configured to execute the instructions to bind the exception member to the application comprises the one or more hardware processors configured to execute the instructions to bind the exception member to a binding supporting an array of values; and
wherein the one or more hardware processors configured to execute the instructions to populate the data in the exception member comprises the one or more hardware processors configured to execute the instructions to populate multiple records of data into the corresponding location in system memory.

12. A computer system, the computer system comprising:
one or more hardware processors;
system memory coupled to the one or more hardware processors, the system memory storing instructions that are executable by the one or more hardware processors;
the one or more hardware processors configured to execute the instructions stored in the system memory to update a template for a data source, including the following:
receive a command from an application to get data from a data instance of the data source in accordance with the template, the template indicating members of the data instance known to a driver;

formulate an exception code at the driver, the exception code indicating that the driver has detected an exception to the template, the exception indicative of the data instance including one or more exception members that do not match member information previously known to the driver;

for at least one of the one or more exception members:
receive a request for an identity of the exception member from the application;
send an indication identifying the exception member to the application;
receive a request for a description of the data in the exception member from the application;
send the description of the data in the exception member; and
modify the template based on the description of the data in the exception member, modifying the template permitting the application to bind the exception member to system memory when accessing data from subsequent data instances of the data source.

13. The computer system of claim 12, further comprising the one or more hardware processors configured to execute the instructions to prior to formulating the exception code send data for one or more additional members of the data instance from the application, the one or more additional members included in the template.

14. The computer system of claim 12, wherein the one or more hardware processors configured to execute the instructions to receive the command to get data from the data instance of the data source in accordance with the template comprises the one or more hardware processors configured to execute the instructions to receive the command from the application to get data from the data instance of the data source in accordance with a blank template.

15. The computer system of claim 12, wherein the one or more hardware processors configured to execute the instructions to formulate an exception code comprise the one or more hardware processors configured to execute the instructions to formulate an exception code indicative of the data instance including one or more new members, the one or more new members not previously included in the template.

16. The computer system of claim 12, wherein the exception code is indicative of the data instance including one or more members that contain a different data type, the different data type not previously indicated in the template for the one or more members.

17. The computer system of claim 12, wherein the exception code is indicative of a known member having one of: a different data length, a different precision, or a different scale, the different data length, precision, or scale not previously indicated in the template for the known member.

18. A method for use at a computer system, the computer system including system memory, the method for consuming a stream of data records from a data source, the method comprising:
specifying instructions based on member information for binding known members of the data source to corresponding locations in the system memory;
issuing a command to a driver to get a data record from the data source, the driver maintaining a template that includes the member information for known members of the data source;
receiving an exception code for the issued command from the driver, the exception code indicating that the driver has detected an exception to the template, the exception indicative of the data record including an exception member, the exception member representing a member of the data record that does not match the template;
receiving an indication identifying the exception member from the driver;
receiving a description of data in the exception member; and
determining how to handle the data for the exception member based on the exception code.

19. The method of claim 18, further comprising prior to determining how to handle the data for the one or more exception members based on the exception code,
requesting a description of the data in the exception member from the driver.

20. The method of claim 18, wherein the exception code is indicative of a known data member containing data that differs from data identified in the template for the known members, the data contained in the known members differing from the template by one or more of: type, length, precision, or scale.

* * * * *